(12) United States Patent
Baxter

(10) Patent No.: US 10,988,003 B2
(45) Date of Patent: Apr. 27, 2021

(54) VEHICLE VISOR ASSEMBLY

(71) Applicant: Ford Global Technologies, LLC, Dearborn, MI (US)

(72) Inventor: Jeffrey T. Baxter, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 16/576,838

(22) Filed: Sep. 20, 2019

(65) Prior Publication Data

US 2021/0086593 A1 Mar. 25, 2021

(51) Int. Cl.
*B60J 3/02* (2006.01)
*B60R 13/02* (2006.01)

(52) U.S. Cl.
CPC ............ *B60J 3/0226* (2013.01); *B60J 3/023* (2013.01); *B60R 13/0212* (2013.01); *B60J 3/0282* (2013.01)

(58) Field of Classification Search
CPC ................................ B60J 3/023; B60J 3/0226
USPC .............................................. 296/97.9, 97.12
See application file for complete search history.

(56) References Cited

U.S. PATENT DOCUMENTS

| | | | | |
|---|---|---|---|---|
| 5,470,123 A * | 11/1995 | Snyder | ................... | B60J 3/0208 296/97.9 |
| 5,560,669 A * | 10/1996 | Gute | ........................ | B60J 3/023 296/97.9 |
| 5,931,525 A | 8/1999 | Rickabus | | |
| 6,491,333 B2 * | 12/2002 | Ichikawa | ................. | B60J 3/023 296/97.13 |
| 7,438,341 B1 | 10/2008 | Olson, Jr. | | |
| 7,798,552 B2 * | 9/2010 | Takai | ..................... | B60J 3/0217 296/97.9 |
| 8,876,186 B2 | 11/2014 | Huelke | | |
| 8,960,762 B2 | 2/2015 | Huelke et al. | | |
| 2002/0017800 A1 | 2/2002 | Ichikawa et al. | | |

\* cited by examiner

*Primary Examiner* — Joseph D. Pape
(74) *Attorney, Agent, or Firm* — David Coppiellie; Price Heneveld LLP

(57) ABSTRACT

A vehicle includes a support structure. A headliner is disposed proximate the support structure and includes a substrate and a cover stock disposed over the substrate. The substrate defines an elongated recess. A visor assembly includes a visor coupled to the headliner via a shaft on a first side of the visor. The visor includes a coupling member on a second opposing side of the visor. The check assembly is coupled to the headliner within the elongated recess and selectively engages the coupling member of the visor. The check assembly includes an upper check member and a lower check member configured to at least partially separate from the upper check member and translate along the elongated recess in response to a predetermined force acting on the lower check member.

20 Claims, 7 Drawing Sheets

VEHICLE VISOR ASSEMBLY

FIELD OF THE DISCLOSURE

The present disclosure generally relates to a visor assembly. More specifically, the present disclosure relates to a visor assembly for a vehicle.

BACKGROUND OF THE DISCLOSURE

Vehicles often include visors for use by vehicle occupants. The visor assembly may be coupled to a vehicle headliner and operable between raised and lowered positions.

SUMMARY OF THE DISCLOSURE

According to at least one aspect of the present disclosure, a vehicle includes a support structure. A headliner is disposed proximate the support structure and includes a substrate and a cover stock disposed over the substrate. The substrate defines an elongated recess. A visor assembly includes a visor coupled to the headliner via a shaft on a first side of the visor. The visor also includes a coupling member on a second opposing side of the visor. The check assembly is coupled to the headliner within the elongated recess and selectively engages the coupling member of the visor. The check assembly includes an upper check member and a lower check member configured to at least partially separate from the upper check member and translate along the elongated recess in response to a predetermined force acting on the lower check member.

According to another aspect of the present disclosure, a vehicle visor assembly includes a headliner that includes a substrate. The substrate defines an aperture. A visor is coupled to a headliner via a shaft. An upper check member is disposed within the aperture and engages an edge of the headliner that defines the aperture. A lower check member includes a body defining a hook to selectively engage the visor and a projection extending therefrom. The projection is coupled to the upper check member. The body separates from the projection in response to a predetermined force acting on the body.

According to yet another aspect of the present disclosure, a visor assembly for a vehicle includes a headliner that includes a substrate that defines an elongated recess and an aperture within the elongated recess. The visor is coupled to the headliner. An upper check member is disposed within the aperture. The lower check member engages the upper check member and includes a body coupled to a projection that has a screw boss and ribs. The screw boss is coupled to the body via the ribs extending therebetween. The ribs of the projection separate from the body in response to a predetermined force acting on the body.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
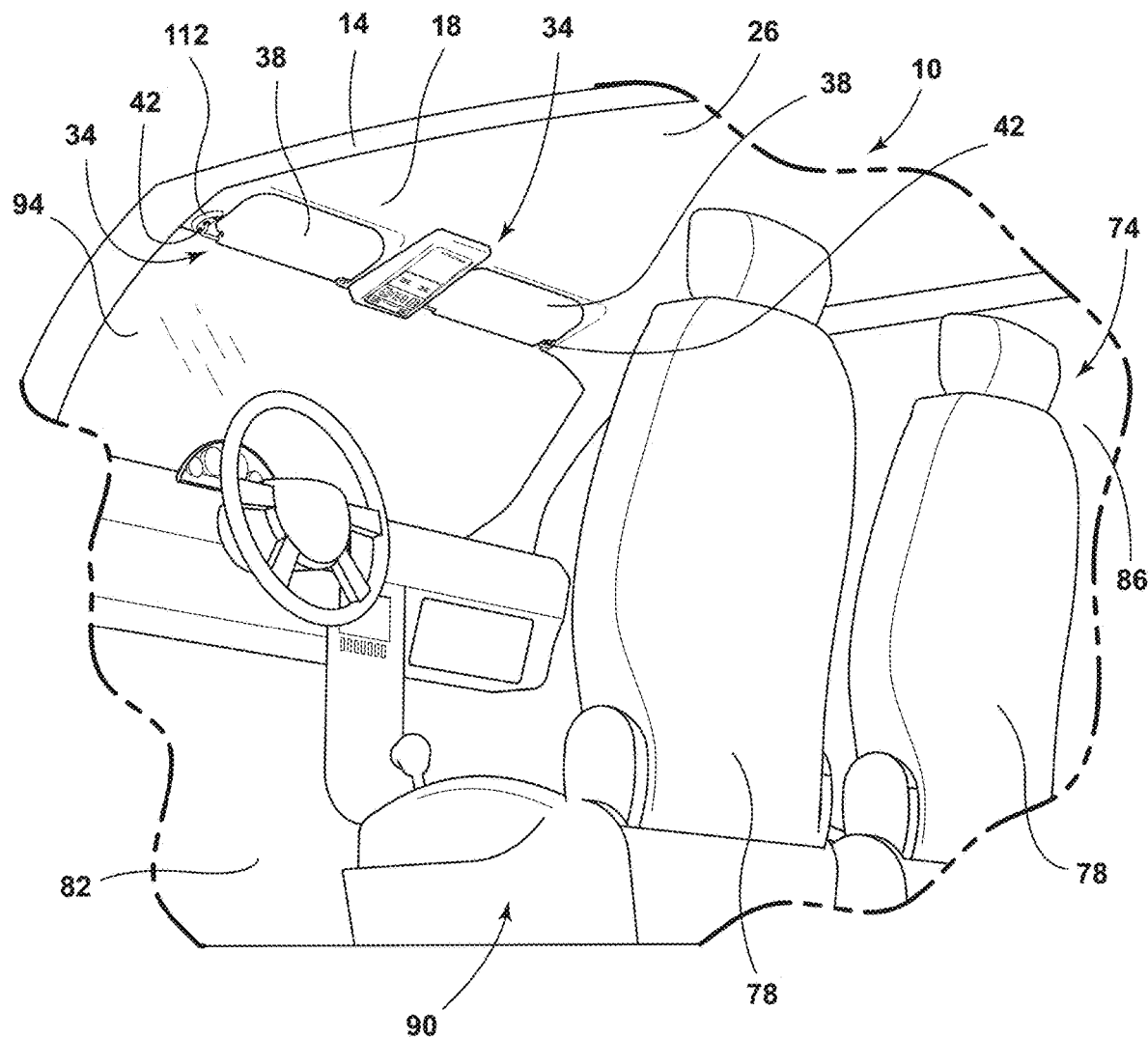
FIG. 1 is a partial side perspective view of a passenger cabin of a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-9D, reference numeral 10 generally refers to a vehicle that includes a support structure 14 and a headliner 18 disposed proximate to the support structure 14. The headliner 18 includes a substrate 22 and a cover stock 26 disposed over the substrate 22. The substrate 22 defines an elongated recess 30. A visor assembly 34 includes a visor 38 coupled to the headliner 18 via a shaft 42 on a first side 46 of the visor 38. The visor 38 includes a coupling member 50 on a second opposing side 54 of the visor 38. A check assembly 58 is coupled to the headliner 18 within the elongated recess 30 and selectively engages the coupling member 50 of the visor 38. The check assembly 58 includes an upper check member 62 and a lower check member 66 configured to at least partially separate from the upper check member 62 and translate along the elongated recess 30 in response to a predetermined force 70 acting on the lower check member 66.

Referring to FIG. 1, the vehicle 10 includes a passenger cabin 74 having multiple seating assemblies 78 positioned therein. As illustrated in FIG. 1, the vehicle 10 includes at least two seating assemblies 78 with one seating assembly 78 disposed on a driver-side 82 and one seating assembly 78 disposed on a passenger-side 86 within the passenger cabin 74. The vehicle 10 may include a single seating row 90, or alternatively, may include multiple seating rows 90 within the passenger cabin 74. The vehicle 10 may be a sedan, a sport utility vehicle, a van, a truck, a crossover, or other style vehicles 10. In various examples, the vehicle 10 may be a manually operated vehicle 10 (e.g., with a human driver), a fully autonomous vehicle 10 (e.g., no human driver), or a partially autonomous vehicle 10 (e.g., operated with or without a human driver). Additionally, the vehicle 10 may be utilized for personal and/or commercial purposes, such as, for ride-providing services (e.g., chauffeuring) and/or ride-sharing services.

According to various aspects, the support structure 14 of the vehicle 10 may be configured as a vehicle body defining the passenger cabin 74. Additionally or alternatively, the support structure 14 may be separate from the body and may be disposed proximate a front window 94 of the vehicle 10. The support structure 14 may include metal materials and/or metal alloy materials to provide a rigid structure for supporting the visor assembly 34. In various examples, the headliner 18 may be disposed proximate the support structure 14. The headliner 18 may include the substrate 22 (FIG. 3) and the cover stock 26 disposed on the substrate 22. The substrate 22 may be formed into a selected shape, for example, the substrate 22 may define the elongated recess 30 (FIG. 3) therein. The cover stock 26 may cover the substrate 22, such that an occupant of the vehicle 10 may not see the substrate 22.

The vehicle 10 may include at least one visor assembly 34 coupled to the headliner 18. As illustrated in FIG. 1, the vehicle 10 may include two visor assemblies 34 that may be substantially mirror images of one another. One visor assembly 34 may be disposed proximate the seating assembly 78 positioned on the driver-side 82, and one visor assembly 34 may be disposed proximate the seating assembly 78 positioned on the passenger-side 86. The visor assemblies 34 may be coupled to the headliner 18 proximate the front window 94. The visor assembly 34 includes the visor 38 operable between a raised position abutting the headliner 18 and a lowered position that extends downward into the passenger cabin 74 from the headliner 18. It is contemplated that the visor 38 may include a variety of additional features, such as, for example, a mirror, a light source, or other features, without departing from the teachings herein.

Figure 2:
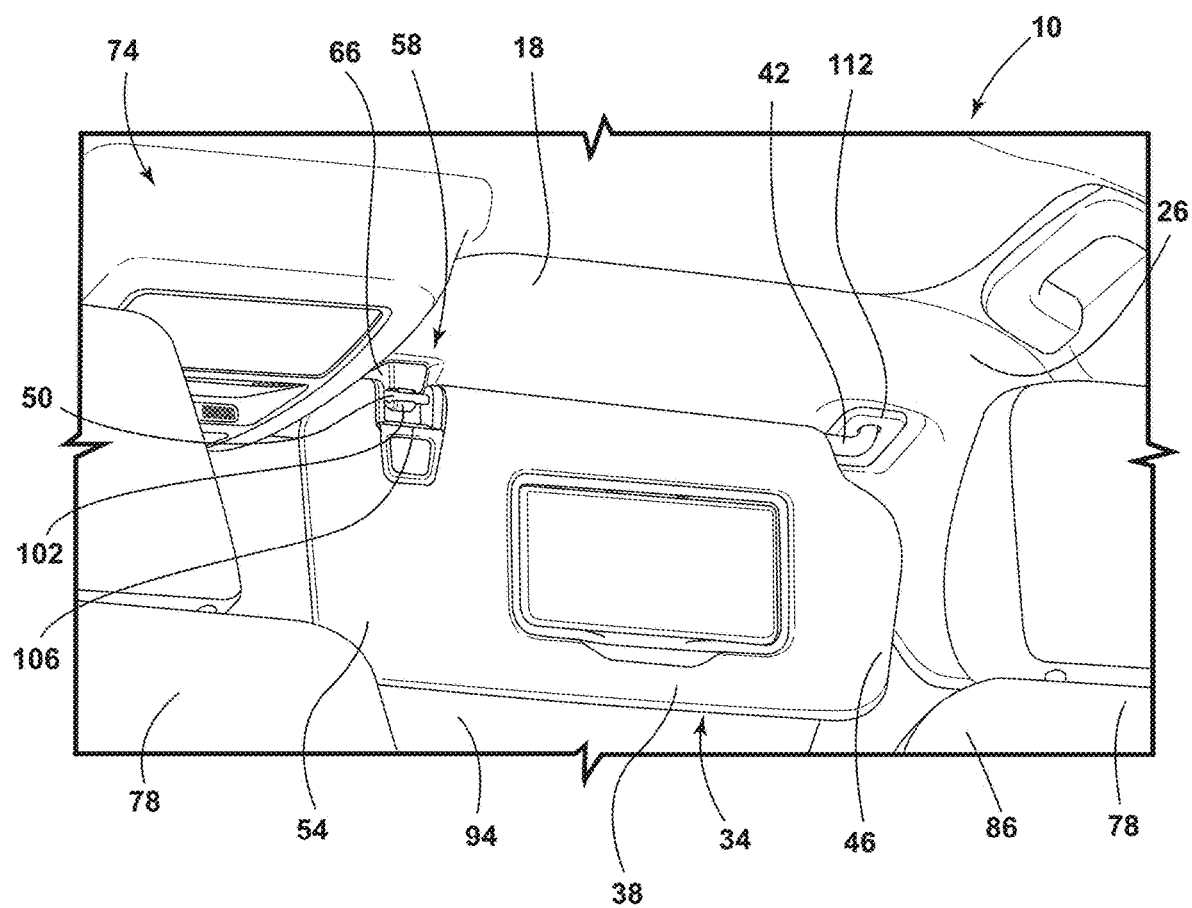
FIG. 2 is a side perspective view of a visor assembly of the vehicle, according to the present disclosure.

Referring to FIG. 2, the first side 46 of the visor 38 is typically coupled to the headliner 18 by the shaft 42. The shaft 42 may be a practical configuration for coupling the visor 38 to the headliner 18 and allowing rotation of the visor 38. The shaft 42 may be coupled to a mounting bracket 112 disposed on the headliner 18. The mounting bracket 112 may provide additional support for the shaft 42. Additionally or alternatively, the visor 38 may rotate about the shaft 42 to rotate between a vehicle-forward position and a side position relative to the seating assembly 78. In this way, the second opposing side 54 may disengage from the check assembly 58 allowing for side-to-side rotation about the shaft 42. The second opposing side 54 of the visor 38 is typically selectively coupled to the headliner 18 by the check assembly 58. A body 98 (FIG. 3) of the lower check member 66 defines a hook 102. The second opposing side 54 of the visor 38 defines a cutout 106 with the coupling member 50 extending therethrough. The coupling member 50 may be configured as a rod or a pin extending laterally across the cutout 106. The coupling member 50 may be configured to selectively engage with the hook 102 of the check assembly 58 to couple the visor 38 thereto. In this way, the visor 38 may engage and/or disengage the hook 102.

Figure 3:
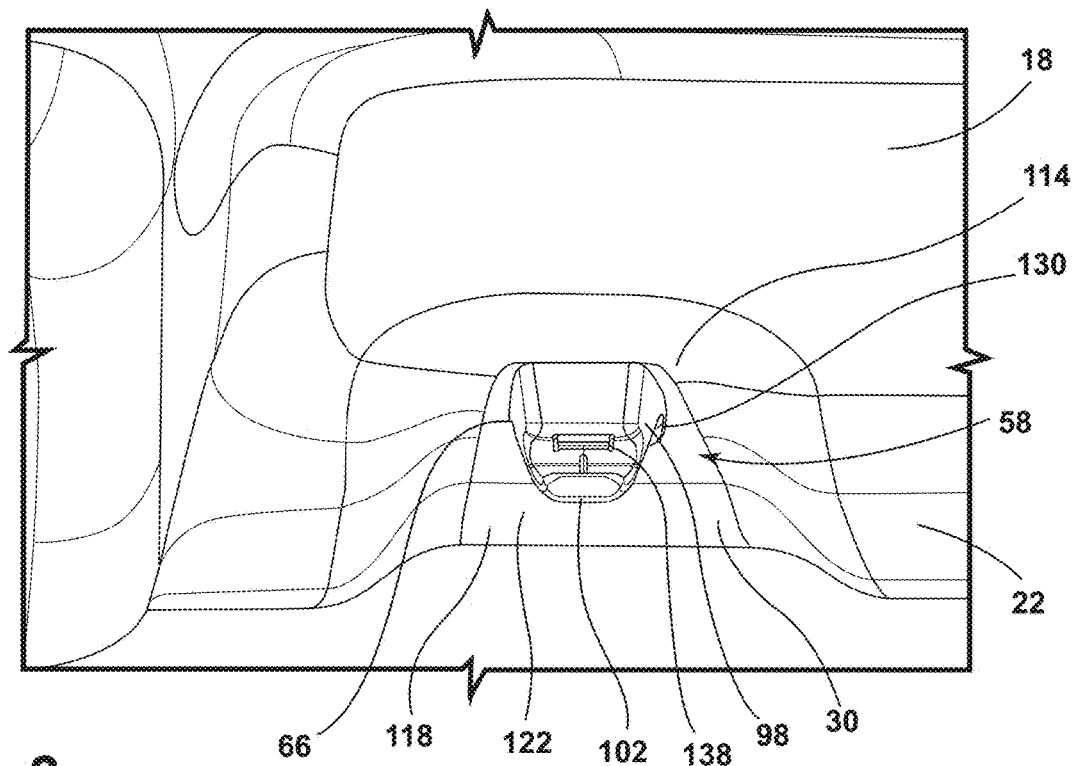
FIG. 3 is a side perspective view of a check assembly for a vehicle visor assembly, according to the present disclosure.
Figure 9A:
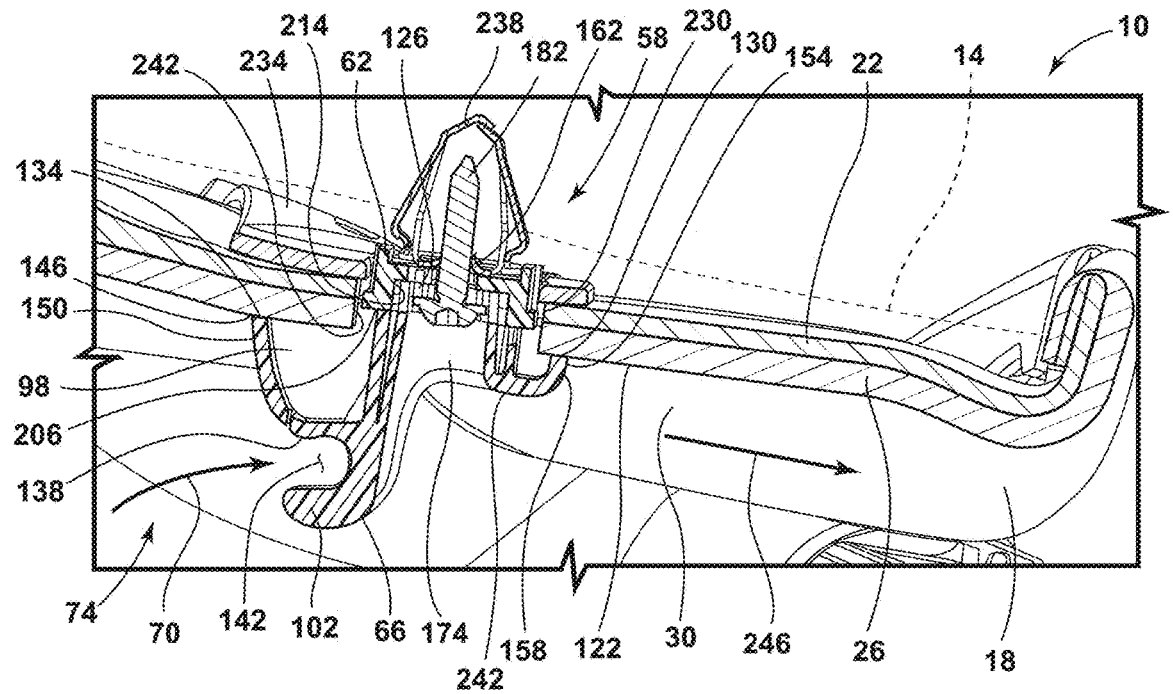
FIG. 9A is a cross-sectional view of an interface between a check assembly and a vehicle headliner, according to the present disclosure.
Figure 9B:
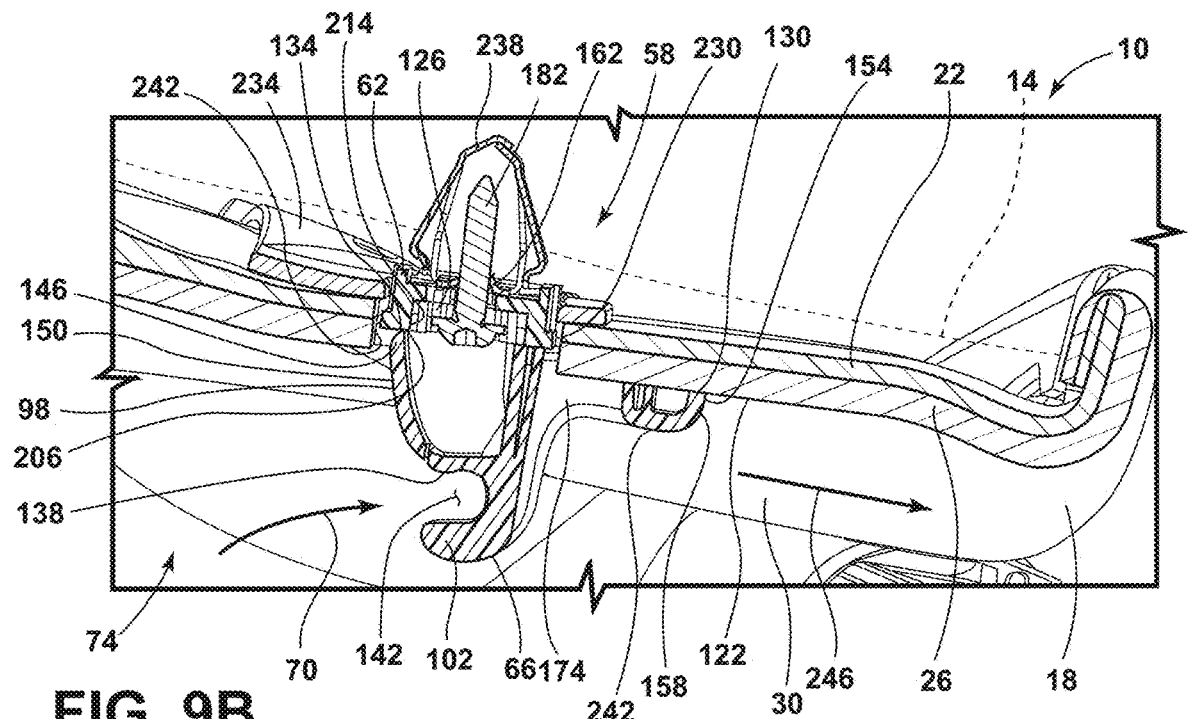
FIG. 9B is a cross-sectional view of an interface between a check assembly and a vehicle headliner, according to the present disclosure.
Figure 9C:
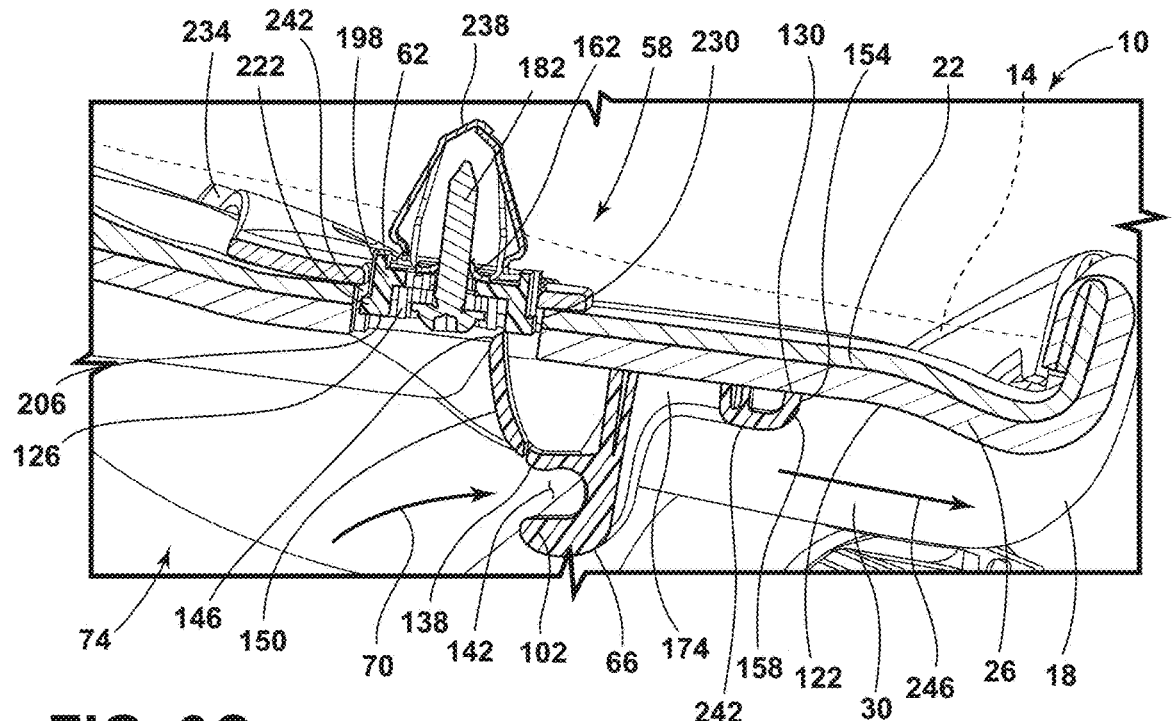
FIG. 9C is a cross-sectional view of an interface between a check assembly and a vehicle headliner, according to the present disclosure.
Figure 9D:
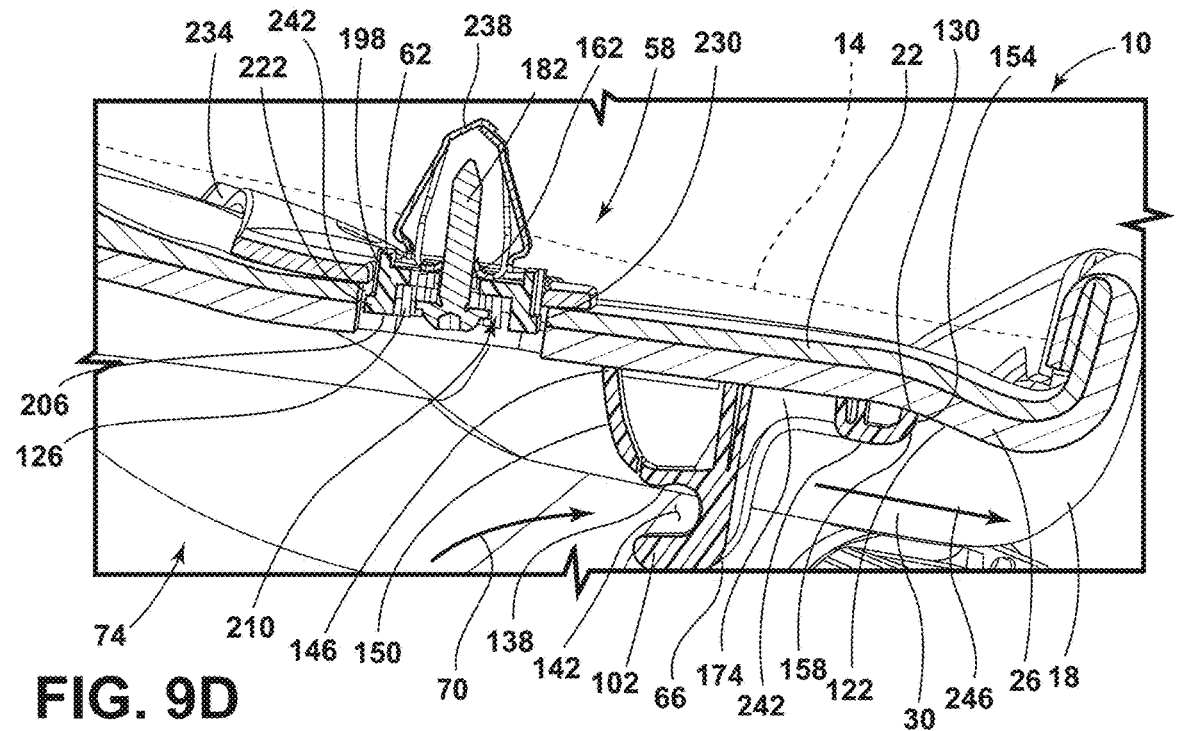
FIG. 9D is a cross-sectional view of an interface between a check assembly and a vehicle headliner, according to the present disclosure.

Referring to FIG. 3, the check assembly 58 may be coupled to the headliner 18 within the elongated recess 30. The elongated recess 30 may have a closed end 114 and an opened end 118. In various examples, the opened end 118 may be in a vehicle-forward position relative to the closed end 114. The check assembly 58 may be disposed proximate the closed end 114 of the elongated recess 30 with the hook 102 opened in a vehicle-rearward direction. According to various aspects, the elongated recess 30 may be defined in a surface 122 of the substrate 22. The surface 122 may be an A-surface of the headliner 18. As used herein, the term "A-surface" refers to a surface of any component with the vehicle 10 that is visible and/or contactable by an occupant or passenger of the vehicle 10 when the component is in an assembled state. Contrastingly, the term "B-surface" as used herein, refers to a surface of any component within the vehicle 10 that is concealed and/or non-contactable by the occupant or passenger of the vehicle 10 when the component is in an assembled state. The surface 122 within the elongated recess 30 may be substantially flat. The substantially flat surface 122 may be advantageous for promoting a sliding engagement between the surface 122 and the lower check member 66 as the lower check member 66 translates across the surface 122 within the elongated recess 30 in response to the predetermined force 70 (FIG. 9A). In various examples, the cover stock 26 (FIG. 2) may cover the substrate 22. The cover stock 26 may include, for example, fabric, cloth, and/or other similar materials. The cover stock 26 may be coupled to the substrate 22, for example, by fasteners and/or adhesives. The lower check member 66 may translate across the cover stock 26 in response to the predetermined force 70. In this way, the cover stock 26 may be substantially the same shape as the substrate 22 to promote the sliding engagement.

Figure 4:
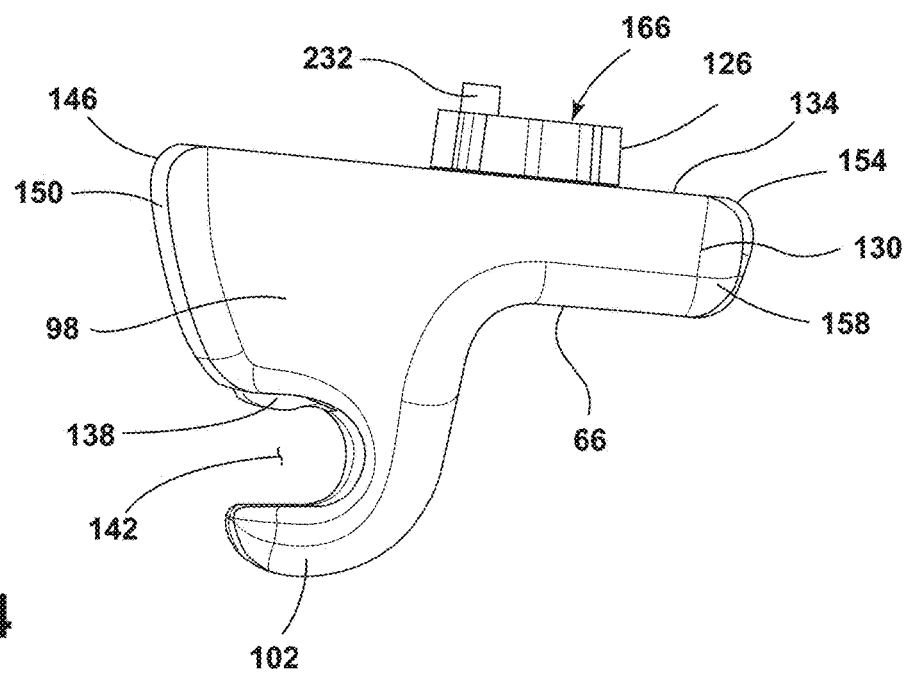
FIG. 4 is a side perspective view of a lower check member of a check assembly for a vehicle visor assembly, according to the present disclosure.

Referring to FIGS. 3 and 4, the lower check member 66 includes the body 98 defining the hook 102 and a projection 126 extending from the body 98 in an opposing direction relative to the hook 102. In various examples, the body 98 may include an elongated portion 130. The elongated portion 130 may include an engagement surface 134 for engaging the surface 122 of the headliner 18. The elongated portion 130 may increase a surface area of the body 98 that engages the surface 122. According to various aspects, the hook 102 may extend downward from the elongate portion 130 and the hook 102 may be opened in a vehicle-rearward direction to engage the coupling member 50 of the visor 38 (FIG. 1). Additionally or alternatively, the body 98 may include a protrusion 138 that extends into a receiving space 142 defined by the hook 102. The hook 102 and the protrusion 138 may both engage the coupling member 50 (FIG. 1) and may operate to retain the coupling member 50 within the receiving space 142.

In various examples, the body 98 may include a first radiused edge 146 extending between the engagement surface 134 and a first side surface 150. Additionally or alternatively, the body 98 and a second radiused edge 154 extend between the engagement surface 134 and a second side surface 158. In various aspects, the first side surface 150 may be a vehicle-rearward surface and the second side surface 158 may be a vehicle-forward surface. The first and second radiused edges 146, 154 may provide for a rounded interface for engaging the headliner 18 (FIG. 1). Additionally or alternatively, the elongated portion 130 in conjunction with at least the second radiused edge 154, may promote the sliding engagement of the body 98 with the headliner 18.

Figure 5:
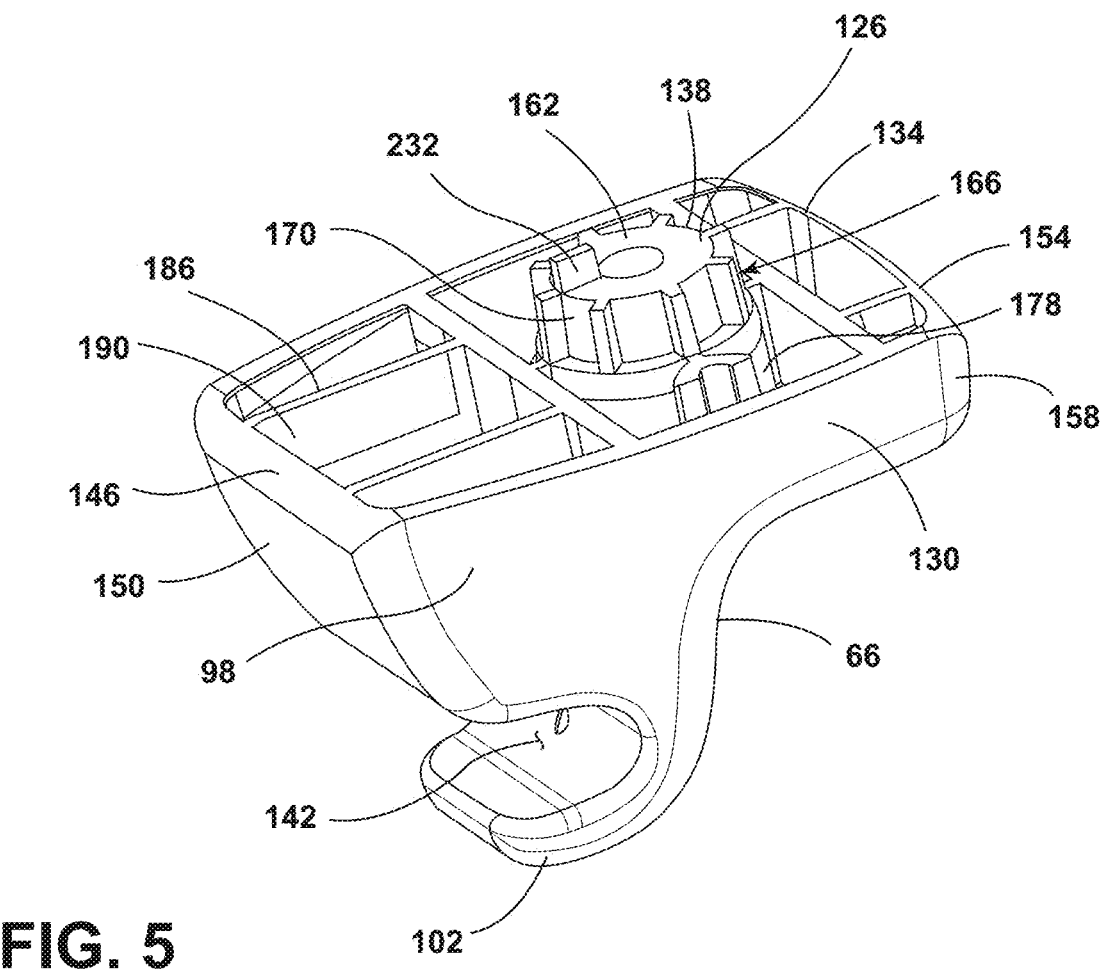
FIG. 5 is a top perspective view of a lower check member of a check assembly for a vehicle visor assembly, according to the present disclosure.

Referring to FIG. 5, the projection 126 extends vertically from the body 98. According to various aspects, the projection 126 may be coupled to and extend beyond the engagement surface 134. The projection 126 may include a screw boss 162. The screw boss 162 may be spaced-apart from the engagement surface 134. In this way, the screw boss 162 may be disposed at an opposing end of the projection 126 relative to the end of the projection 126 that couples with the body 98. The screw boss 162 is configured to receive a fastener 182 (FIG. 9A) therein. Additionally or alternatively, the projection 126 may include a plurality of ribs 166. The plurality of ribs 166 may extend radially outward from the screw boss 162. In various examples, the plurality of ribs 166 may be coupled to one another by a wall extending between adjacent ribs 166. Alternatively, the plurality of ribs 166 may define a gap between the adjacent ribs 166. In such examples, the plurality of ribs 166 may couple the screw boss 162 to the body 98. Stated differently, the plurality of rib 166 may extend between the screw boss 162 and the body 98. Moreover, in examples where the plurality of ribs 166 are spaced-apart from one another and define the gaps therebetween, the plurality of ribs 166 may be the contact points between the projection 126 and the body 98. Accordingly, the screw boss 162 may be disposed on a distal end 170 of the projection 126 relative to the engagement surface 134 of the body 98 of the lower check member 66 and coupled thereto by the plurality of ribs 166. This configuration may limit the contact between the projection 126 and the body 98 to promote the separation thereof in response to the predetermined force 70 (FIG. 9A).

Figure 6:
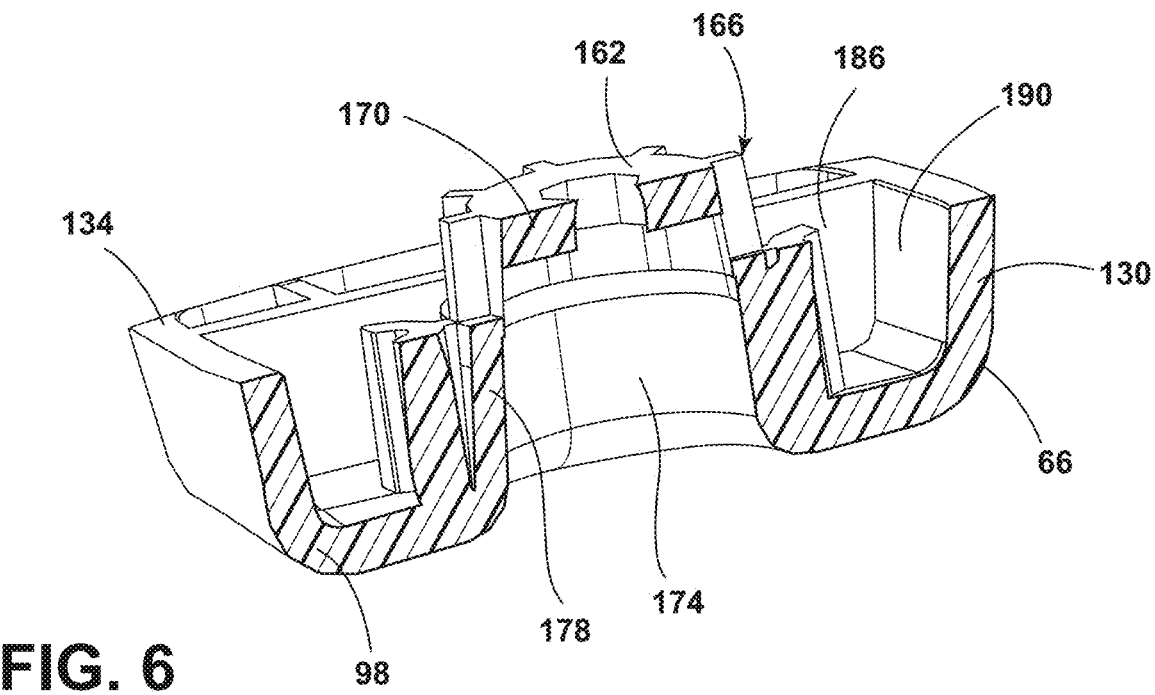
FIG. 6 is a cross-sectional view of an interface between a projection and a body of a lower check member for a check assembly, according to the present disclosure.

Referring to FIG. 6, the lower check member 66 may define a receiving hole 174 extending through the body 98 proximate the hook 102 (FIG. 2). Stated differently, the receiving hole 174 may extend through the elongated portion 130 of the body 98. The receiving hole 174 may be defined by a receiving wall 178 centrally located within the body 98. In various examples, the projection 126 may extend from the receiving wall 178. The screw boss 162 may align with the receiving hole 174 to receive the fastener 182 (FIG. 9A) therethrough. According to various aspects, the receiving hole 174 may reduce the engagement between the body 98 and the projection 126 to promote separation of the body 98 in response to the predetermined force 70 (FIG. 9A).

In various examples, the body 98 may include support features 186 extending between the first and second side surfaces 150, 158 (FIG. 5). In this way, the body 98 may define cavities 190. The cavities 190 may be advantageous for reducing the cost of production and/or manufacturing by reducing materials of the lower check member 66. Additionally or alternatively, the support features 186 may increase the strength and/or the rigidity of the lower check member 66. However, it is also contemplated that the body 98 may be solid, such that fewer and/or no cavities 190 are defined.

Figure 7:
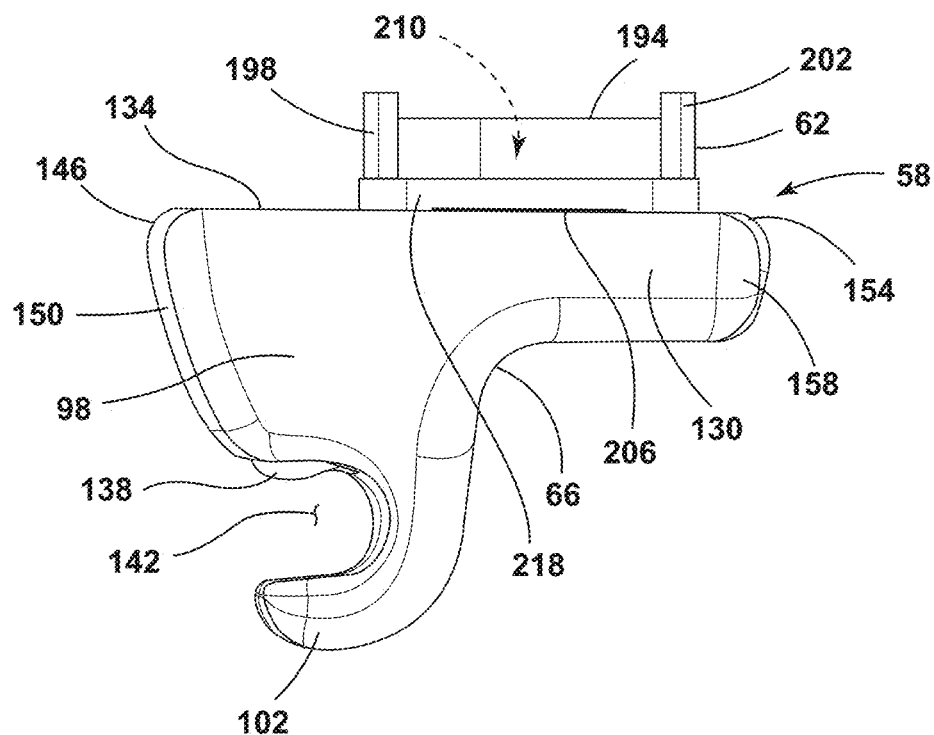
FIG. 7 is a side elevational view of upper and lower check members of a check assembly for a vehicle visor assembly, according to the present disclosure.

Referring to FIGS. 5 and 7, the lower check member 66 may engage the upper check member 62. The upper check member 62 may include a base 194 and first and second engagement features 198, 202 coupled to the base 194 and diametrically opposed to one another. The projection 126 may be coupled to the upper check member 62, such that the engagement surface 134 of the lower check member 66 may abut a lower surface 206 of the upper check member 62. The upper check member 62 may define a receiving cavity 210 within the base 194 to receive the protrusion. The receiving cavity 210 may substantially correspond to the size and/or shape of the projection 126. When the check assembly 58 is assembled, the projection 126 may be disposed within the receiving cavity 210. The plurality of ribs 166 may engage an inner surface 214 (FIG. 8) of the base 194 to retain the projection 126 within the receiving cavity 210. According to various aspects, the receiving wall 178 of the lower check member 66, the projection 126, and the base 194 may have substantially similar sizes and/or shapes to correspond with one another. As illustrated in FIGS. 5 and 7, each of the receiving wall 178, the projection 126, and the base 194 may be substantially circular and/or oblong in cross-section. However, the receiving wall 178, the projection 126, and/or the base 194 may have any practicable shape and/or size without departing the teachings herein.

Figure 8:
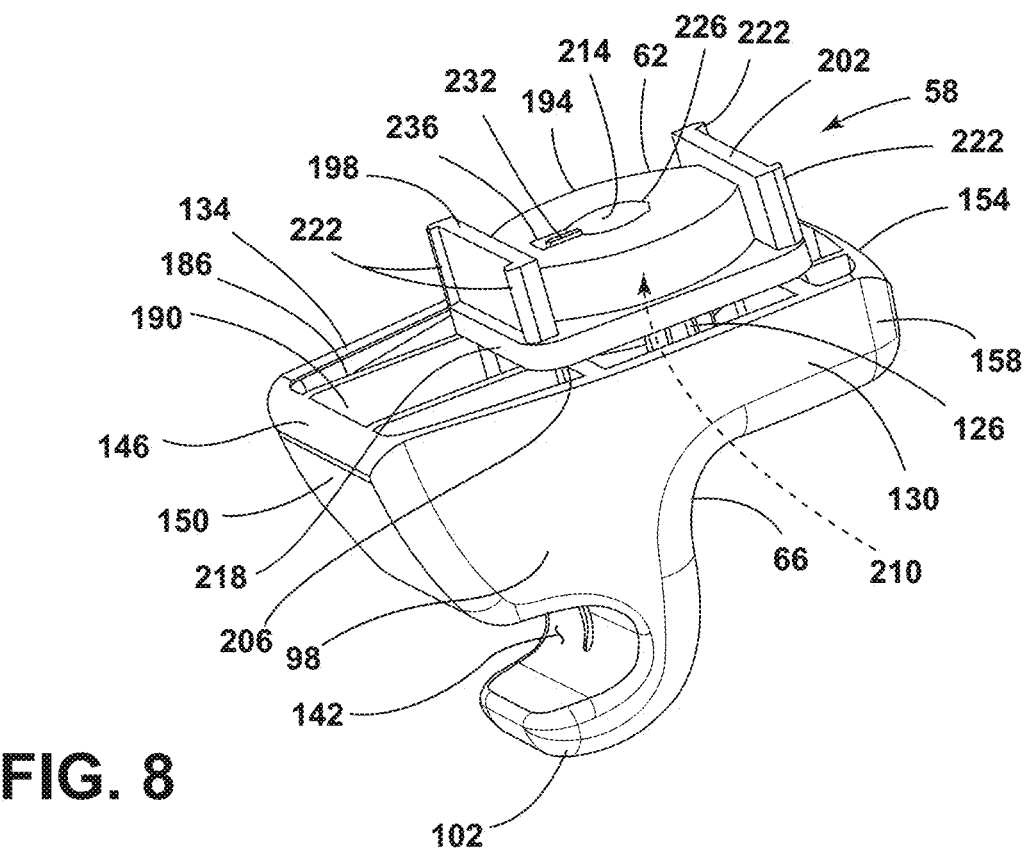
FIG. 8 is a side perspective view of a check assembly for a vehicle visor assembly, according to the present disclosure.

The upper check member 62 may include a base plate 218 from which the base 194 and the first and second engagement features 198, 202 extend. The first and second engagement features 198, 202 may be substantially linear, such that the first and second engagement features 198, 202 may engage the headliner 18 (FIG. 1). According to various aspects, each of the first and second engagement features 198, 202 may include one or more engagement tabs 222 extending outwardly therefrom. In this way, the engagement tabs 222 of the first engagement feature 198 may extend in an opposing direction relative to the engagement tabs 222 of the second engagement feature 202. As illustrated in FIG. 8, the engagement tabs 222 of the first and second engagement features 198, 202 may extend outward, away from one another in opposing directions. Additionally or alternatively, the first and second engagement features 198, 202 may extend a further distance from the base plate 218 relative to the base 194 for coupling with the headliner 18 (FIG. 1). The base 194 may define a receiving hole 226 that is configured to correspond with the receiving wall 178 of the body 98 to receive the fastener 182 (FIG. 9A) therethrough. In this way, the lower check member 66 may be mechanically fastened to the upper check member 62.

Referring to FIGS. 5 and 8, in various examples, the projection 126 may include a locating extension 232 extending from the screw boss 162. The locating extension 232 may be configured to extend into a slot 236 defined by the base 194 of the upper check member 62. The locating extension 232 and the slot 236 may be advantageous for properly aligning the lower check member 66 with the upper check member 62. According to various aspects, the slot 236 may be an extension of the receiving hole 226, however, it is also contemplated that the slot 236 may be separately defined. The locating extension 232 and the slot 236 may provide for a poka-yoke assembly of the check assembly 58.

Referring to FIGS. 9A-9D, the check assembly 58 may be coupled to the headliner 18. The headliner 18 may define an aperture 230 within the elongated recess 30. The aperture 230 may extend through the substrate 22 and the cover stock 26. The upper check member 62 may be disposed within the aperture 230. The engagement tabs 222 of each of the first and second engagement features 198, 202 may engage the substrate 22 to retain the upper check member 62 within the aperture 230. In various examples, a reinforcement bracket 234 may be coupled to the headliner 18. The reinforcement bracket 234 may engage a B-surface of the headliner 18 to provide additional support for an interface between the check assembly 58 and the headliner 18. In a non-limiting example, the reinforcement bracket 234 may be an overhead console bracket. Additionally or alternatively, the reinforcement bracket 234 may be an injection molded plastic component.

According to various aspects, the fastener 182 (FIG. 9A) may extend through the lower check member 66, the upper check member 62, and the headliner 18 to complete the check assembly 58 to the headliner 18. The fastener 182 may also extend through the support structure 14. In various examples, the fastener 182 may be secured to the headliner 18 by a clip 238. In this way, the fastener 182 and the clip 238 may retain the check assembly 58 to the headliner 18. Additionally or alternatively, the fastener 182 and the clip 238 may retain the upper check member 62 and the projection 126 within the aperture 230 when the predetermined force 70 is acting upon the check assembly 58.

When assembled with the headliner 18, the upper check member 62 may be disposed within the aperture 230 and the lower check member 66 may be engaged with the upper check member 62. The lower check member 66 may extend vertically from the headliner 18 into the passenger cabin 74. The projection 126 may couple with the upper check member 62. In various examples, the fastener 182 may secure the projection 126 to the upper check member 62 by extending through the screw boss 162 of the lower check member 66 and the receiving hole 226 of the upper check member 62. Further, the plurality of ribs 166 (FIG. 5) may promote the engagement between the projection 126 and the upper check member 62.

According to various aspects, the check assembly 58 includes the upper check member 62 and the lower check member 66 configured to at least partially separate from the upper check member 62 in response to the predetermined force 70 acting on the lower check member 66. Typically, the predetermined force 70 may act upon the lower check member 66 proximate the first side surface 150 and/or the hook 102. In this way, the predetermined force 70 may move in a vehicle-forward direction to engage the lower check member 66. A portion of the lower check member 66 may be configured to translate along the surface 122 within the elongated recess 30. In this way, the body 98 of the lower check member 66 may be configured to separate from the upper check member 62. Additionally or alternatively, the projection 126 may be configured to separate from the body 98 in response to the predetermined force 70. In this way the lower check member 66 may separate into two components (e.g., the projection 126 and the body 98) in response to the predetermined force 70. Stated differently, the plurality of ribs 166 may separate from the receiving wall 178 of the body 98 in response to the predetermined force 70 acting on the body 98.

When the predetermined force 70 acts on the lower check member 66, the body 98 may translate along the surface 122 of the headliner 18 within the elongated recess 30. In various examples, the body 98 may be configured to move in a vehicle-forward direction along the elongated recess 30. The substantially flat surface 122 may be advantageous for promoting the sliding engagement between the surface 122 and the body 98. Stated differently, the engagement surface 134 of the body 98 may slidably engage the surface 122 within the elongated recess 30. The second radiused edge 154 extending between the engagement surface 134 and the second side surface 158 may promote the sliding engagement of the body 98 with the surface 122. In this way, at least the second radiused edge 154 may prevent the body 98 from pressing into the headliner 18 instead of sliding across the surface 122. Additionally or alternatively, the second radiused edge 154 may promote the sliding engagement which may prevent the body 98 from moving into the aperture 230 and/or rotating against the headliner 18.

When the body 98 separates from the projection 126, the projection 126 may remain in the receiving cavity 210 of the upper check member 62. The projection 126 may be retained within the upper check member 62 by the fastener 182 extending therethrough. The screw boss 162 and the plurality of ribs 166 may each have a thickness that promotes separation of the plurality of ribs 166 from the body 98. When the projection 126 is separated from the body 98, the upper check member 62 and the projection 126 may operate as a ramp for the body 98 to slidably engage. In this way, the lower surface 206 of the upper check member 62 may slidably engage the engagement surface 134. This arrangement may promote the translation of the body 98 in response to the predetermined force 70. The upper check member 62 and the separated projection 126 acting as the ramp may be advantageous for preventing the body 98 from moving through the aperture 230 in response to the predetermined force 70. In this way, the upper check member 62 and/or the separated projection 126, may promote the translation of the body 98 across the surface 122.

Referring still to FIGS. 9A-9D, the engagement tabs 222 of the upper check member 62 may engage an edge 242 of the headliner 18 that defines the aperture 230. In this way, the engagement tabs 222 and the fastener 182 may promote the upper check member 62 remaining within the aperture 230 when the predetermined force 70 is acting on the body 98 of the lower check member 66. The upper check member 62 may separate from the body 98 of the lower check member 66. The body 98 may be displaced from the projection 126 and the upper check member 62 in response to the predetermined force 70 acting the check assembly 58. The engagement surface 134 may engage the surface 122 within the elongated recess 30. In this way, the body 98 may translate along the elongated recess 30, which may form a displacement path 246 along which the body 98 may travel. The translation of the body 98 may be advantageous for preventing rotation of the body 98 in response to the predetermined force 70. Additionally or alternatively, the lower check member 66 may separate into two pieces (e.g., the projection 126 and the body 98).

Use of the present device may provide a variety of advantages. For example, the check assembly 58 may include two component (e.g., the upper and lower check members 62, 66), which may provide a selected breaking point in response to the predetermined force 70 acting on the check assembly 58. Further, the engagement between the projection 126 and the upper check member 62 may allow the projection 126 to separate from the body 98 of the lower check member 66 in response to the predetermined force 70. Additionally, the second radiused edge 154 may promote the sliding engagement of the body 98 with the surface 122 as the body 98 translates across the surface 122 in response to the predetermined force 70. Also, the elongated recess 30 having a substantially flat surface 122 may promote the translation of the body 98 along the surface 122 in the displacement path 246. Moreover, the translation of the body 98 in response to the predetermined force 70 may prevent the body 98 from rotating in response to the predetermined force 70. Further, the upper and lower check members 62, 66 may separate at least partially from one another in response to the predetermined force 70 to prevent the check assembly 58 from breaking into additional pieces in response to the predetermined force 70. Additionally, the upper check member 62 may operate as a ramp for the body 98 of the lower check member 66 to prevent the body 98 from moving into the aperture 230. In response to the predetermined force 70, the two-piece check assembly 58 configuration may provide for the body 98 of the lower check member 66 separating from the upper check member 62 on the projection 126 of the lower check member 66 and translate along the displacement path 246 and away from the object causing the predetermined force 70. Additional advantages of the present device may be realized and/or achieved.

According to various examples, a vehicle includes a support structure. A headliner is disposed proximate the support structure and includes a substrate and a cover stock disposed over the substrate. The substrate defines an elongated recess. A visor assembly includes a visor coupled to the headliner on a shaft on a first side of the visor. The visor includes a coupling member on the second opposing side of the visor. The check assembly is coupled to the headliner within the elongated recess and selectively engages the coupling member of the visor. The check assembly includes an upper check member and a lower check member configured to at least partially separate from the upper check member and translate along the elongated recess in response to a predetermined force acting on the lower check member. Embodiments of the present disclosure may include one or a combination of the following features:

- a surface within an elongated recess is substantially flat;
- a headliner defines an aperture within an elongated recess, and an upper check member is disposed within the aperture and engages an edge of the headliner that defines the aperture;
- a lower check member includes a body and a projection that extends therefrom;
- a projection includes a screw boss and a plurality of ribs, and the plurality of ribs couples the screw boss to a body;
- a projection separates from a body in response to a predetermined force acting on the body; and
- an end of a lower check member includes a radiused edge to engage a headliner as the lower check member translates along an elongated recess.

According to various examples, a vehicle visor assembly includes a headliner that includes a substrate. The substrate defines an aperture. A visor is coupled to the headliner via a shaft. An upper check member is disposed within the aperture and engages an edge of the headliner that defines the aperture. A lower check member includes a body that defines a hook to selectively engage the visor and a projection extending therefrom. The projection is coupled to the upper check member. The body separates from the projection in response to a predetermined force acting on the body. Embodiments of the present disclosure may include one or a combination of the following features:

- a projection includes a screw boss and a plurality of radially extending ribs;
- a plurality of radially extending ribs extend between a screw boss and a body;
- a body separates from a plurality of radially extending ribs in response to a predetermined force;
- a headliner defines an elongated recess with a substantially flat surface therein;
- a body translates along a headliner within an elongated recess in response to a predetermined force; and
- an upper check member defines a receiving cavity for receiving a projection, and the projection is coupled to a lower check member and is disposed within a receiving cavity when a body separates from the projection and translates along a headliner in response to a predetermined force.

According to various examples, a visor assembly for a vehicle includes a headliner that includes a substrate that defines an elongated recess and an aperture within the elongated recess. A visor is coupled to the headliner. An upper check member is disposed within the aperture. The lower check member engages the upper check member and includes a body coupled to a projection having a screw boss and ribs. The screw boss is coupled to the body via the ribs extending therebetween. The ribs of the projection separate from the body in response to a predetermined force acting on the body. Embodiments of the present disclosure may include one or a combination of the following features:

- a body translates on a surface in an elongated recess in response to a predetermined force;
- an upper check member and a projection slidably engage an engagement surface of a body of a lower check member as the body translates along a surface;
- a body includes a radiused edge for engaging a headliner as the body translates along a surface;
- an upper check member includes a receiving cavity for receiving a projection of a lower check member; and
- ribs extend radially from a screw boss and engage an inner surface of an upper check member within a receiving cavity.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
   a support structure;
   a headliner disposed proximate the support structure and including a substrate and a cover stock disposed over the substrate, wherein the substrate defines an elongated recess;
   a visor assembly including a visor coupled to the headliner via a shaft on a first side of the visor, wherein the visor includes a coupling member on a second opposing side of the visor; and
   a check assembly coupled to the headliner within the elongated recess and selectively engaging the coupling member of the visor, wherein the check assembly includes an upper check member and a lower check member configured to at least partially separate from the upper check member and translate along the elongated recess in response to a predetermined force acting on the lower check member.

2. The vehicle of claim 1, wherein a surface within the elongated recess is substantially flat.

3. The vehicle of claim 1, wherein the headliner defines an aperture within the elongated recess, and wherein the upper check member is disposed within the aperture and engages an edge of the headliner defining the aperture.

4. The vehicle of claim 1, wherein the lower check member includes a body and a projection extending therefrom.

5. The vehicle of claim 4, wherein the projection includes a screw boss and a plurality of ribs, wherein the plurality of ribs couple the screw boss to the body.

6. The vehicle of claim 4, wherein the projection separates from the body in response to the predetermined force acting on the body.

7. The vehicle of claim 1, wherein an end of the lower check member includes a radiused edge to engage the headliner as the lower check member translates along the elongated recess.

8. A vehicle visor assembly, comprising:
   a headliner including a substrate, wherein the substrate defines an aperture;
   a visor coupled to the headliner via a shaft;
   an upper check member disposed within the aperture and engaging an edge of the headliner that defines the aperture; and
   a lower check member including a body defining a hook to selectively engage the visor and a projection extending therefrom, wherein the projection is coupled to the upper check member, and wherein the body separates from the projection in response to a predetermined force acting on the body.

9. The vehicle visor assembly of claim 8, wherein the projection includes a screw boss and a plurality of radially extending ribs.

10. The vehicle visor assembly of claim 9, wherein the plurality of radially extending ribs extend between the screw boss and the body.

11. The vehicle visor assembly of claim 9, wherein the body separates from the plurality of radially extending ribs in response to the predetermined force.

12. The vehicle visor assembly of claim 8, wherein the headliner defines an elongated recess with a substantially flat surface therein.

13. The vehicle visor assembly of claim 12, wherein the body translates along the headliner within the elongated recess in response to the predetermined force.

14. The vehicle visor assembly of claim 8, wherein the upper check member defines a receiving cavity for receiving the projection, and wherein the projection is coupled to the upper check member and disposed within the receiving cavity when the body separates from the projection and translates along the headliner in response to the predetermined force.

15. A visor assembly for a vehicle, comprising:
a headliner including a substrate defining an elongated recess and an aperture within the elongated recess;
a visor coupled to the headliner;
an upper check member disposed within the aperture; and
a lower check member engaging the upper check member and including a body coupled to a projection having a screw boss and ribs, wherein the screw boss is coupled to the body via the ribs extending therebetween, and wherein the ribs of the projection separate from the body in response to a predetermined force acting on the body.

16. The visor assembly of claim 15, wherein the body translates along a surface within the elongated recess in response to the predetermined force.

17. The visor assembly of claim 16, wherein the upper check member and the projection slidably engage an engagement surface of the body of the lower check member as the body translates along the surface.

18. The visor assembly of claim 16, wherein an end of the body includes a radiused edge for engaging the headliner as the body translates along the surface.

19. The visor assembly of claim 15, wherein the upper check member includes a receiving cavity for receiving the projection of the lower check member.

20. The visor assembly of claim 15, wherein the ribs extend radially from the screw boss and engage an inner surface of the upper check member within a receiving cavity.

* * * * *